Patented Apr. 2, 1940

2,195,827

UNITED STATES PATENT OFFICE 2,195,827

PROCESS OF PRODUCING VULCANIZED ARTICLES FROM LATEX

Albert O. Ryan, Trenton, N. J., assignor to The Barrett Company, New York, N. Y., a corporation of New Jersey No Drawing. Application July 29, 1937,
Serial No. 156,318

3 Claims. (Cl. 260—739)

This invention relates to rubber compounding and more particularly to the incorporation of sulfur vulcanizing agent in natural or artificial latex or other rubber compositions in which the rubber particles, which may be natural or synthetic, are dispersed in a suitable menstruum. The term latex is used herein in a broad sense and is intended to include suspensions or dispersions of rubber particles, including synthetic rubber and devulcanized reclaimed rubber, in an aqueous or other suitable menstruum with or without preservatives.

It is well known in the rubber industry to use latex directly, i. e. without previously coagulating the dispersed rubber particles, in the manufacture of rubber goods. The processes of manufacture differ markedly in some respects, i. e., in the manner of applying or forming the film of latex composition; in the descriptive terminology of the art, latex goods may be classified as: "dipped," "spread," "molded," "impregnated," "extruded," "sprayed," "electro-deposited," and so on. In most of these processes, also, coagulation of the latex may be accomplished in several ways, e. g. (1) drying, (2) filtering, (3) heat coagulation, (4) "delayed" coagulation, (5) electro-phoretic processes, and (6) treatment with chemical solutions (causing either true coagulation or dehydration). For example, certain lines of "dipped" rubber products such as surgical gloves, bathing caps, etc., are regularly made by dipping moulds conforming in shape to the desired product in natural latex with which are admixed colloidal sulfur vulcanizing agent, pigments, fillers, accelerators, etc., followed by coagulation of the rubber particles by dipping the moulds in a bath containing a suitable coagulant and then vulcanizing the rubber. As a result of past experience in the art it now is generally recognized that a very intimate association of sulfur and rubber in a latex composition is necessary to obtain best results. Obviously, any reduction in particle size of the sulfur tends in the desired direction; it is common practice to use a finely ground sulfur, and in numerous cases a colloidal sulfur is preferred even though it is comparatively expensive.

The present invention aims primarily to provide a process of compounding rubber products directly from latex in which ordinary sulfur is employed as the vulcanizing agent and is introduced into the latex in a form such that it more readily combines with the rubber than even the colloidal sulfur heretofore employed. Other objects and advantages of this invention will be apparent from the following detailed description.

With the preferred embodiment of the invention in mind and without intention to limit the scope more than is required by the prior art, the invention briefly stated involves blending ordinary sulfur with paracoumarone resin and then dispersing the resultant blend in an aqueous medium, using an emulsifying agent if necessary so that a suspension or dispersion of particles of the blend is obtained. This dispersion is added to the latex and the mixture employed in the manufacture of rubber products as was heretofore the practice, i. e., accelerators, pigments, stabilizing agents, promoters, etc., in solution or as dispersions are added to the latex before or after the addition thereto of the paracoumarone resin sulfur dispersion, the latex composition thereafter being treated in various ways, according to well-known practice in the art, depending upon the type of rubber product desired. This invention comprehends the vulcanizable rubber composition resulting from the mixing of latex with a dispersion of a blend of naphtha resin, specifically paracoumarone resin, and sulfur, as well as the process of making such rubber composition.

In carrying out the invention, in one example, a dispersion of paracoumarone resin and sulfur in an aqueous medium was formed by melting paracoumarone resin having a melting point of 122° C., melting the sulfur, mixing the molten resin and sulfur at a temperature slightly above the melting point of the paracoumarone resin in the proportion of 1 part sulfur to 7 parts of resin, cooling the mixture until solid, then crushing and grinding it until it was reduced to a powdery condition. This powder was dispersed in an aqueous medium containing suitable dispersing agents, e. g., sodium casinate and a sodium salt of the condensation product of naphthalene sulfonic acid and formaldehyde, by grinding the mixture in a ball mill until the desired dispersion resulted (the maximum particle size, readily determined by microscopic examination, being less than 30 microns (0.03 mm.)).

While the proportions may be widely varied to meet the requirements of use to which the dispersion is to be put, the following forms a dispersion suitable for addition to latex:

| | Parts |
|---|---|
| Paracoumarone resin | 420 |
| Sulfur (flowers of) | 60 |
| Sulfonated dispersing agent | 3 |
| Sodium caseinate (10% solution) | 70 |
| Water | 180 |

The paracoumarone resin employed in this invention may have a melting point falling within the range of from about 5° to about 160° C. The proportion of paracoumarone resin blended with sulfur may vary from about 1.5 to about 20 parts resin for each part of sulfur. Paracoumarone resin is ordinarily made by the sulfuric acid polymerization of coal tar or water gas tar naphtha fractions containing coumarone, indene and associated polymerizable compounds. Other polymerization methods may, of course, be used. Naphthas from cracked gasoline or from the polymerization of natural or petroleum refinery gases may be similarly treated to yield resins.

Suitable dispersions of blends of paracoumarone or naphtha resins with the sulfur can be made using other dispersing agents such as glue, soaps, alginates and other dispersion aids well-known in the art.

The dispersions may be produced to form a master batch and this batch employed as the supply for different batches of latex, the dispersion from the master batch being added to the latex batches in quantities to give the desired amounts of sulfur admixed with the latex in the production of the desired rubber products.

Paracoumarone resin I have found functions as a solubilizer for the sulfur, i. e., it causes the sulfur to be intimately associated with the rubber particles in a highly reactive form so that the sulfur combines more readily or more of the sulfur present reacts or combines with the rubber than in the case where the sulfur is introduced in colloidal or dispersed condition without the paracoumarone resin. This will be evident from the following comparative tests of rubber samples made from latex admixed with (A) sulfur dispersion containing no paracoumarone resin, and (B) dispersion of the paracoumarone-resin-sulfur blend, the rubber products of "A" and "B" being made from the same latex and under otherwise like conditions and subjected to the tests hereinafter described.

Samples of rubber were made as follows: To a centrifuged latex containing 64.75% total solids was added a dispersion made by grinding zinc dimethyldithiocarbamate accelerator in the presence of dimethyl ammonium oleate as a dispersing agent, which also functions as a stabilizer for the latex, and cyclohexanol which, as is well known, aids in solution of the dimethyl ammonium oleate. Zinc oxide, which functions as an activator for the accelerator, and the sulfur vulcanizing agent were separately ground in a ball mill in the presence of a solution of dimethyl ammonium caseinate. These dispersions were added to the latex mixture along with dimethylamine solution (which was added to maintain the alkalinity and thus stabilize the latex), and the resultant mix was diluted with water to a concentration of 60% solids.

Another batch was prepared as above except that a blend of coumarone resin and sulfur was substituted for the sulfur previously used. The blend was prepared by melting together two parts paracoumarone resin having a melting point of 79° C. and one part sulfur. The blended material was cooled, pulverized and ground in a ball mill with a dilute dimethyl ammonium caseinate solution for about five days (just as was done with sulfur in the previous batch); the resultant dispersion was added to latex with the other compounding materials.

The formula of the two batches was as follows:

| | A | B |
|---|---|---|
| Rubber latex (total solids) | 100 | 100 |
| Zinc dimethyldithiocarbamate | .5 | .5 |
| Zinc oxide | 2 | 2 |
| Sulfur | 3 | |
| Paracoumarone resin-sulfur blend | | *9 |
| Cyclohexanol | .25 | .25 |
| Dimethyl ammonium oleate | .5 | .5 |
| Dimethylamine | .5 | .5 |
| Casein | .11 | .3 |

*Of which 3 parts were sulfur.

Test films were prepared by dipping glass plates in these rubber compounds and coagulating by dipping into a mixture of equal volumes of 80% acetic acid and methanol in accordance with the following dip cycle: 15 seconds dip in latex mix, 15 seconds dip in the acid-methanol coagulant, 10 minutes drying at room temperature, 90 seconds dip in the latex, 15 seconds dip in the acid methanol, air drying at room temperature for about 18 hours and then curing samples in live steam at 10 pounds pressure (239° F.) for (1) 10 minutes, (2) 20 minutes, (3) 30 minutes and (4) 40 minutes.

The resultant samples were tested in accordance with accepted tests of the rubber industry to determine (a) tensile strength, (b) stretch in inches, (c) stress in pounds per square inch required to produce certain percentage elongation.

T–50 tests were also made. These tests involved elongating 1″ samples 600%, (i. e., until the samples were 7″ long), freezing the elongated samples at a temperature of about −60° C., then gradually warming them up and measuring the temperature of the samples when they had lost 50% of the initial elongation (i. e., had retracted to a 4″ length). The industry recognizes that this test indicates the relative amount of combined sulfur in the vulcanized rubber product; as between two closely similar samples subjected to this test, the lower the temperature of the sample when it returns to 50% of its initial elongation, the greater the amount of combined sulfur.

The results of the tests are given below:

*Tensile properties of test pieces*

(A) TEST PIECES IN THE MAKING OF WHICH SULFUR WITHOUT PARACOUMARONE RESIN WAS EMPLOYED AS THE VULCANIZING AGENT

| Vulcanization time at 239° F., minutes | Tensile strength, lbs./sq. inch | Stretch, inches per inch | Temperature noted in T-50 test | Stress, lbs./sq. inch— | |
|---|---|---|---|---|---|
| | | | | At 500% elongation | At 600% elongation |
| 10 | 3204 | 10.2 | °C. +3.0 | 260 | 474 |
| 20 | 3451 | 9.7 | +2.8 | 317 | 586 |
| 30 | 3698 | 9.0 | −9.9 | 458 | 1130 |
| 40 | 3859 | 8.7 | −17.0 | 625 | 1411 |

(B) TEST PIECES IN THE MAKING OF WHICH PARACOUMARONE RESIN-SULFUR BLEND WAS ADDED TO THE LATEX; HEADINGS SAME AS ABOVE

| 10 | 3210 | 10.2 | °C. +1.1 | 289 | 541 |
|---|---|---|---|---|---|
| 20 | 3391 | 9.8 | −2.8 | 341 | 699 |
| 30 | 3640 | 9.3 | −15.7 | 451 | 1030 |
| 40 | 3750 | 8.8 | −22.0 | 574 | 1287 |

It will be noted from the results of the T–50 tests that the B samples, those made with paracoumarone resin sulfur blends, upon reaching the four inch length were at a lower temperature than the A test pieces made with sulfur not blended with resin. This, as above discussed, shows that in the B pieces more of the sulfur combined with the rubber than in the A pieces. This is confirmed by the results of the tensile strength tests. It will be noted that the tensile strength of the B test pieces was substantially the same as the A samples. The fact that the paracoumarone resin diluent did not result in a substantial reduction of the tensile strength of the B test pieces as compared with the A indicates that more of the sulfur in the B test pieces combined with the rubber than in the A pieces.

The dispersion of this invention, comprising latex and sulfur-naphtha-resin blend together with suitable dispersing and stabilizing agents, may be made in bulk and stored before use; for example, the dispersions may be made by a rubber-processing concern and sold to a fabricator for use in making vulcanized rubber goods. Additional compounding ingredients, such as accelerators, antioxidants, activators, dispersed fillers and coloring agents, can be added to the dispersions during their production or afterwards, or in part during and in part after their production.

In addition to the above indicated advantages of this invention, namely, that the sulfur is introduced into the latex in a form that is more reactive or more readily or completely combines with the rubber and hence the rate of curing is accelerated, there is the further advantage that it is generally more economical to blend the sulfur with resin, disperse the blend and use this dispersion than to employ comparatively expensive colloidal sulfur vulcanizing agent.

The term "paracoumarone resin" is used in the specification and claims in a broad sense and is intended to include resins produced by the polymerization (by heat or chemical reagents) of the resin-forming constituents of naphthas derived from coal-coking and carburetted water-gas operations; such constituents ordinarily comprise coumarone, indene, styrene, cyclopentadiene and their homologs, in varying proportions. The term "naphtha resin" is used to include resins produced from naphthas of petroleum origin as well as from coal naphthas.

It is to be understood that this invention is not restricted to the present disclosure otherwise than defined by the appended claims.

I claim:

1. In the process of producing vulcanized rubber articles of manufacture directly from a latex batch containing sulfur as the vulcanizing agent and paracoumarone resin, the improvement which comprises fusing the sulfur with paracoumarone resin to form a homogeneous blend of the sulfur and the resin, dispersing the sulfur-resin blend in an aqueous medium, adding the resultant dispersion to latex, coagulating the latex containing said dispersion and then vulcanizing the coagulated latex.

2. In the process of producing vulcanized rubber articles of manufacture directly from a latex batch containing sulfur as the vulcanizing agent and paracoumarone resin, the improvement which comprises fusing the sulfur with paracoumarone resin having a melting point of from about 5° to 160° C. to form a homogeneous blend of the sulfur and the resin, dispersing the sulfur-resin blend in an aqueous medium containing a dispersing agent, adding the resultant dispersion to latex, coagulating the latex and then vulcanizing the coagulated latex.

3. In the process of producing vulcanized articles of manufacture directly from a latex batch containing sulfur as the vulcanizing agent and paracoumarone resin, the improvement which comprises fusing the sulfur with paracoumarone resin having a melting point of from about 5° to 160° C. in proportions of about 1 part by weight of sulfur to between about 1.5 and 20 parts by weight of the paracoumarone resin to form a homogeneous blend of the sulfur and the resin, cooling the blend to cause it to solidify, grinding the blend to a powder, dispersing the powdered blend in an aqueous medium containing a dispersing agent, adding the dispersion to latex, coagulating the latex and then vulcanizing the coagulated latex.

ALBERT O. RYAN.